United States Patent [19]
Kaines

[11] Patent Number: 5,651,356
[45] Date of Patent: Jul. 29, 1997

[54] PORTABLE HEATER

[76] Inventor: Michael D. Kaines, 3633 Croton Dr., Newaygo, Mich. 49337

[21] Appl. No.: 508,313

[22] Filed: Jul. 27, 1995

[51] Int. Cl.$^6$ .................................................... F24C 1/16
[52] U.S. Cl. ..................... 126/59; 126/65; 126/261; 126/204
[58] Field of Search ....................... 126/204, 261, 126/59, 58, 61, 65, 4, 6, 100

[56] References Cited

U.S. PATENT DOCUMENTS

| | | |
|---|---|---|
| 128,878 | 7/1872 | Harmon . |
| D. 133,633 | 9/1942 | Heuer .................................. D23/336 |
| 136,521 | 3/1873 | Isham . |
| 175,263 | 3/1876 | Sullivan . |
| 295,400 | 3/1884 | Iredell . |
| 603,113 | 4/1898 | Morse . |
| 629,544 | 7/1899 | Cadman . |
| 685,194 | 10/1901 | Young . |
| 743,223 | 11/1903 | Bauer, Jr. . |
| 1,035,863 | 8/1912 | Cullen . |
| 1,436,076 | 11/1922 | Barstow . |
| 2,190,139 | 2/1940 | Stockell ..................................... 126/25 |
| 2,488,014 | 11/1949 | Higman ...................................... 126/59 |
| 4,691,688 | 9/1987 | Urso ..................................... 126/204 X |
| 4,722,322 | 2/1988 | Varney ....................................... 126/261 |
| 4,915,091 | 4/1990 | Varney ....................................... 126/65 |

*Primary Examiner*—Larry Jones
*Attorney, Agent, or Firm*—Price, Heneveld, Cooper, DeWitt and Litton

[57] ABSTRACT

A portable heater comprising a fire chamber vessel, an outer enclosure container around the vessel for retaining it, the container bottom being spaced below the vessel bottom to define a vertical space therebetween, the container breadth being sufficiently greater than the vessel breadth to cause the container peripheral wall and the vessel peripheral wall to define a circumferential space therebetween, an upright air flow control member in the circumferential space spaced from the container peripheral wall to create convection air-flow, heat-insulating space between the control member and container peripheral wall, and having an upper discharge outlet; the control member being spaced from the vessel peripheral wall and oriented to create an upwardly convergent convection heat exchange air flow conduit between the flow control member and the vessel peripheral wall, and an upper heat outlet between said control member and said vessel for discharge of heated air; air flow inlet openings in the container adjacent the container bottom, and air flow inlet orifices past said air flow control member adjacent the container bottom from the circumferential space to the conduit, whereby convection air flow will occur partially up through the heat insulating space to the discharge outlet and partially up through the air flow conduit to the upper heat outlet, to draw ambient air through the container openings and partially through the orifices for continued air circulation. A closure cover is configured to removably interfit with the vessel open top, and has a thermally insulated handle for portability.

15 Claims, 2 Drawing Sheets

5,651,356

PORTABLE HEATER

BACKGROUND OF THE INVENTION

This invention relates to portable heaters of the type that burn charcoal, for fishing, camping, hunting shelters, boating, spectator sports and the like.

A variety of wood or charcoal burning stoves and heaters have been previously proposed over the last several decades, certain ones of which have been provided with handles for portability. As far as is known, however, these prior heaters, when operational, have had the characteristic of being very hot to the touch. Therefore, these heaters have not only been a potential hazard for burns, especially for children, but also not truly portable, or at best very difficult and hazardous to move from place to place, even if theoretically possible.

SUMMARY OF THE INVENTION

An object of this invention is to provide a portable heater of the charcoal burning type, which is not only efficient in operation, creating convection flow of hot air, but which is also cool and safe to the touch, even when operational. The heater provides a quietly generated, inexpensive heat. It can be readily transported to the woods or other place of use, in hand or even in a vehicle, safely and reliably. It is efficient when ignited, operational on a small amount of fuel, draws unheated air and ejects it in a stream as heated air, yet without moving devices such as fans. The device can be manufactured at a reasonable price so as to be readily affordable.

The novel heater has a unique triple wall construction formed in such a manner that it creates convection flow past the fire chamber vessel, the air flow being caused to occur in a manner that both keeps the exterior surface cool, and optimizes heat exchange from the fire chamber. The heater has the fire chamber vessel spaced from the surrounding enclosure container, both around the periphery and at the bottom, there being a flow control member or divider in the space between the two, causing upward air flow between the divider and the outer container for thermal insulation, and air flow between the divider and the fire chamber vessel wall for heat transfer from the heater as well as a thermal insulation effect. This divider has a frustoconical configuration, creating an upwardly convergent heat exchange air flow conduit between the flow control member and the fire chamber vessel wall, for optimizing upward draft along the surface of the fire chamber for optimum output. The outer container has air inlet openings adjacent the bottom of the chamber. Air flow is also allowed at the adjacent bottom of the divider member, preferably through orifices. Hence, a controlled, desired portion of the air entering the outer container flows upwardly through the thermal insulating space between the flow control member and the outer wall, and the other portion of the entering air flows between the flow control member and the fire chamber vessel wall.

These and other objects, advantages and features of the invention will become apparent upon studying the following specification in conjunction with the drawings.

DESCRIPTION OF THE PREFERRED EMBODIMENT

Figure 1:
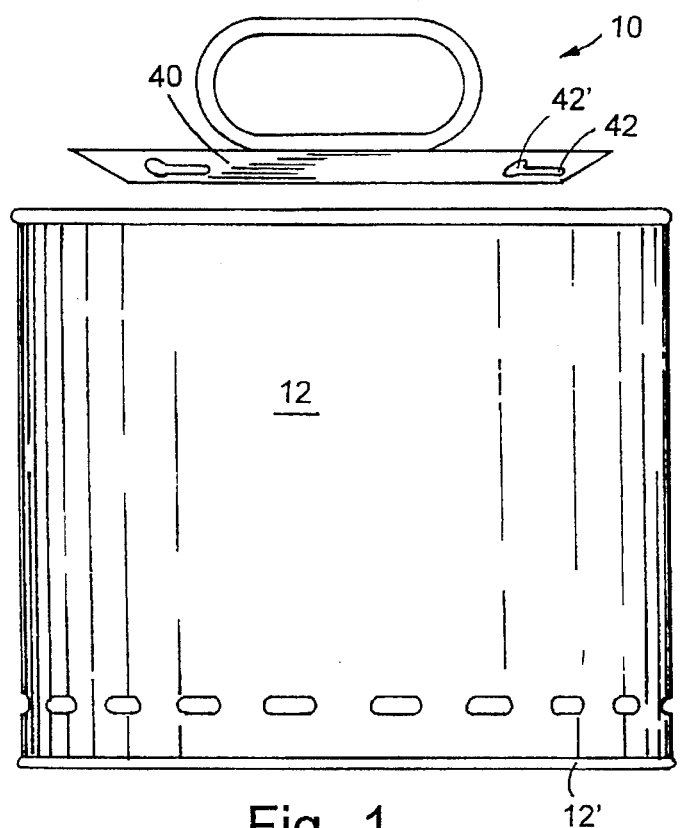
FIG. 1 is an elevational view of the novel heater with the cover and handle shown removed from the remainder of the assembly.
Figure 2:
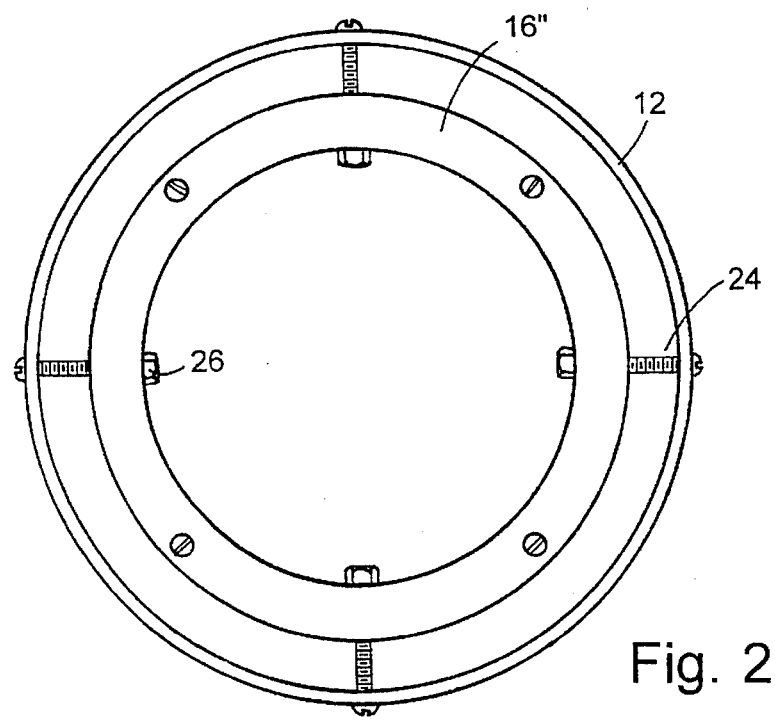
FIG. 2 is a top plan view of the heater in FIG. 1, with the cover and handle removed.

Referring now specifically to the drawings, the assembly 10 in FIG. 1 comprises a generally cylindrical outer enclosure container 12 having a bottom 12', a peripheral wall, an open top and a breadth or diameter. Suspended within this outer container is a fire chamber vessel 16 which preferably is also cylindrical in cross section, and has a peripheral wall, a bottom 16', a depth which is less than the depth of outer container 12, and an open top. Preferably the upper rim of vessel 16 is generally coplanar with the upper rim of container 12, and has an upwardly outwardly flared top 16". Extending upwardly-inwardly from the flared top 16" are a plurality of rivet type pins or studs 18 generally normal to the upwardly outwardly extending top 16".

Figure 3:
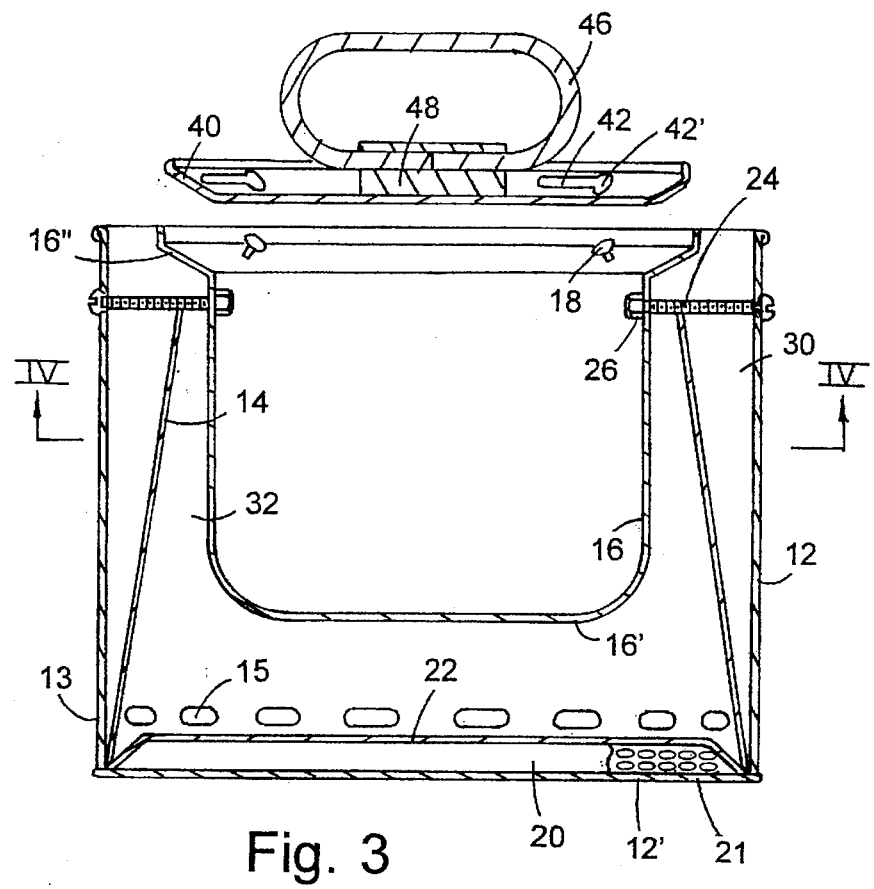
FIG. 3 is a side elevational, sectional view of the novel assembly, with the cover and handle shown extended above the assembly.
Figure 4:
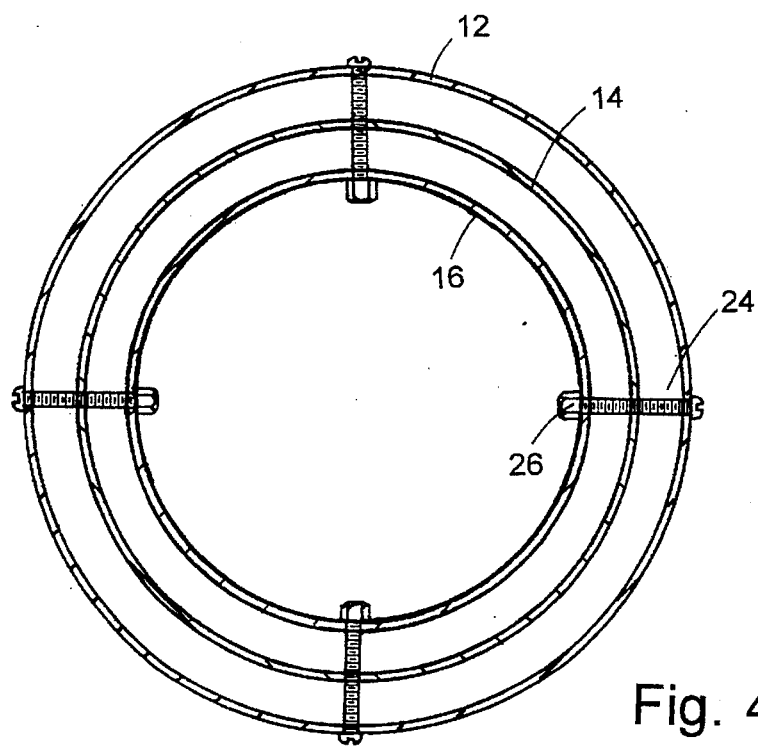
FIG. 4 is a sectional view taken on plane IV—IV of FIG. 3.

Vessel bottom 16' is spaced upwardly from container bottom 12'. Container bottom 12' has thermal insulation which may be in the form of an air space 20 between a pair of vertically spaced horizontal panels 12' and 22, preferably supported at the periphery of bottom 12' by a diagonally downwardly outwardly oriented flange as depicted in FIG. 3. Alternatively, this air space 20 may be substituted by or supplemented by a layer of thermal insulation 21 such as solid polymeric foam materials of conventional type, or the equivalent.

The peripheral wall of vessel 16 is spaced inwardly from the peripheral wall of container 12 to define a circumferential space therebetween. Vessel 16 is suspended in this condition from container 12 by fasteners such as a plurality of threaded bolts or studs 24 extending through the two spaced peripheral walls, and secured in position as by cooperative nuts 26 or the equivalent. Preferably, these threaded fasteners 24 also rest on the upper edge of an upright air flow control member 14 which is located in the circumferential space between container 12 and vessel 16. The air flow control member is preferably frustoconically configured, having its smaller diameter end oriented upwardly and its larger diameter end oriented downwardly, the latter resting upon and being held in place at the outer periphery of container bottom 12". Although fasteners 24 could conceivably extend through control member 14, this is not necessary since member 14 can be retained securely beneath fasteners 24 and above bottom 12'. Control member 14 thereby divides the circumferential space into an outer heat insulating space 30 between the inner peripheral wall of container 12 and control member 14, and an inner heat exchange conduit 32 between control member 14 and the outer peripheral wall of vessel 16.

Adjacent the bottom of container 12, through the peripheral wall thereof as depicted, is a plurality of air inlet openings 13. Also, adjacent the bottom of control member 14 is a plurality of air inlet orifices 15. At the top of space 30 is an open discharge outer. At the top of conduit 32 is an upper heat outlet. Hence, cool ambient air entering openings 13 will partially flow up between divider 14 and the inner peripheral wall of container 12 by connection to the upper discharge outlet for thermally insulating the outside of the container to keep it cool. Simultaneously, a desired portion of the same cool ambient air flowing through openings 13 will flow by convection through orifices 15 and upwardly along the outer surface of heated vessel 16, i.e., through conduit 32 between the outer peripheral wall of vessel 16 and the inner surface of control member 14, to be heated and discharged through the upper heat discharge outlet. The discharged air from both space 30 and conduit 32 will mix and flow out between the upper rim of vessel 16 and the upper rim of container 12, into the ambient air. Air flow control member 14, by its upwardly inwardly sloped configuration, causes conduit 32 to be constricted gradually toward the top of vessel 16 such that ambient air flowing by convection past the peripheral wall of vessel 16 increases in velocity while being forced closer to vessel 16, to scrub the surface of the vessel for efficient heat transfer from the fire chamber. The venturi type discharge will also drawn air up through space 30.

The open top of vessel 16 can be closed by a cover 40 which is generally horizontal in configuration but with an upwardly-outwardly flared rim to match the configuration of the upwardly-outwardly flared rim 16" of vessel 16. Cover 40 is shown to include horizontally elongated, arcuate slots 42 having one end enlarged at 42' sufficiently to receive the heads of rivets 18. A grab handle 46 is mounted to the center of cover 40 by an insulator block 48. By placing cover 40 on vessel 16 such that the heads of rivets 18 pass through enlarged openings 42', and then rotating the cover using handle 46, the vessel can be closed to largely curtail further combustion air from entering the fire chamber while totally containing the hot charcoal fuel from spillage, for safe transportation thereof.

In use, charcoal is placed in the bottom of fire chamber vessel 16 and ignited. Once the charcoal is burning adequately, air in conduit 32 will heat, rise and discharge. Air in space 30 will also heat to a lower temperature to rise and discharge. This convection flow will cause ambient air to be drawn through openings 13, partially flowing up through space 30, and partially flowing through orifices 15 and up conduit 32, to the upper outlets. It has been determined by experimentation that air flow through space 30 keeps the outer container 12 cool to the touch so as to not be dangerous, while the flow through conduit 32 is heated efficiently. The two air flows mix above the upper rim of control member 14, and exit into the ambient air for effective heating of the space around the heater. If it is desired to dampen heat output, cover 40 is placed on the open top of vessel 16 to limit entry of oxygen flow. If it is desired to move the heater from place to place, the cover is rotated to lock the slots and pins 42 and 18 together. Experimentation has shown that it can be safely carried from place to place by hand, or taken by vehicle, without complications. The heat generated from the charcoal will continue for a considerable time after the cover is placed in position, due to residual combustion air remaining in the vessel.

The bottom air space 20, either with or without or substituted by a layer of solid insulation such as a foam polymer, causes the bottom of the container to remain cool so as to not endanger a person or the surface on which it is placed.

Conceivably those skilled in this field might consider certain additional features or modifications to be made to accommodate certain uses. The invention is not intended to be limited to the specific preferred embodiment set forth, but only by the scope of the appended claims and the reasonably equivalent structures to those defined therein.

The embodiments of the invention in which an exclusive property or privilege is claimed are defined as follows:

1. A portable heater comprising:
   a fire chamber vessel having a peripheral wall, a bottom, a depth, a breadth and an open top;
   an outer enclosure container around said vessel for retaining said vessel;
   said container having a bottom, a peripheral wall, an open top, and a breadth;
   said container bottom being spaced below said vessel bottom to define a vertical space therebetween;
   said container breadth being sufficiently greater than said vessel breadth to cause said container peripheral wall and said vessel peripheral wall to define a circumferential space therebetween;
   mounting fasteners between said vessel and said container, retaining said vessel and said container in spaced relationship to each other;
   an upright air flow control member in said circumferential space, said control member being spaced from said container peripheral wall to create convection air-flow, heat-insulating space between said control member and said container peripheral wall, and having an upper discharge outlet;
   said control member being spaced from said vessel peripheral wall and oriented to create an upwardly convergent, convection heat exchange air flow conduit between said flow control member and said vessel peripheral wall, and an upper heat outlet between said control member and said vessel for discharge of heated air;
   air flow inlet openings in said container adjacent said container bottom; and
   air flow inlet orifice means for air flow past said air flow control member, adjacent said container bottom, from said circumferential space to said conduit whereby convection air flow will occur partially up through said heat insulating space and through said discharge outlet, and partially up through said upwardly convergent air flow conduit and through said upper heat outlet, to draw ambient air through said container openings and partially through said orifice means for continued air circulation.

2. The portable heater in claim 1 including a closure cover for said vessel configured to removably interfit with said vessel open top.

3. The portable heater in claim 2 including interfitting connectors on said vessel open top and said closure cover.

4. The portable heater in claim 3 wherein said interfitting connectors comprise a plurality of spaced slots on one of said open top and said closure cover, and a plurality of interfitting studs on the other of said open top and said closure cover, cooperative with said slots.

5. The portable heater in claim 3 including a carrying handle on said closure cover, and thermal insulation between said handle and said closure cover.

6. The portable heater in claim 1 wherein said mounting fasteners are at spaced locations around said vessel and container.

7. The portable heater in claim 6 wherein said fasteners also retain said flow control member in position.

8. The portable heater in claim 1 wherein said openings are in said container peripheral wall.

9. A portable heater comprising:
   a fire chamber vessel having a peripheral wall, a bottom, a depth, a breadth and an open top;
   an outer enclosure container around said vessel;
   said container having a bottom, a peripheral wall, an open top, and a breadth;
   said container bottom being spaced below said vessel bottom;

said container breadth being sufficiently greater than said vessel breadth to cause said container peripheral wall and said vessel peripheral wall to define a circumferential space therebetween;

fastener means between said vessel and said container for retaining said vessel and said container in spaced relationship;

an upright air flow control member in said circumferential space, said control member being spaced from said container peripheral wall to create a thermal insulating space, and spaced from said vessel peripheral wall and oriented to create a heat exchange air flow conduit between said flow control member and said vessel peripheral wall, and having an upper heat outlet from said heat exchange air flow conduit for discharge of heated air from said heat exchange air flow conduit;

air flow inlet means to said heat exchange air flow conduit for air flow up through said heat exchange air flow conduit and said upper heat outlet; and a closure cover for said vessel configured to removably interfit with said vessel open top, and a carrying handle on said cover thermally insulated from said cover.

10. The portable heater in claim 9 including interfitting connectors on said vessel open top and said closure cover, whereby said heater can be carried by said handle.

11. The portable heater in claim 10 wherein said interfitting connectors comprise a plurality of spaced slots on one of said open top and said closure cover, and a plurality of interfitting studs on the other of said open top and said closure cover, cooperative with said slots to secure said cover in place on said vessel.

12. A portable heater comprising:

a fire chamber vessel having a peripheral wall, a bottom, a depth, a breadth and an open top;

an outer enclosure container around said vessel;

said container having a bottom, a peripheral wall, an open top, and a breadth;

said container bottom being spaced below said vessel bottom;

said container breadth being sufficiently greater than said vessel breadth to cause said container peripheral wall and said vessel peripheral wall to define a circumferential space therebetween;

fastener means between said vessel and said container for retaining said vessel and said container in spaced relationship;

an upright air flow control member in said circumferential space, said control member being spaced from said container peripheral wall to create a thermal insulating space, and spaced from said vessel peripheral wall and oriented to create a heat exchange air flow conduit between said flow control member and said vessel peripheral wall, and having an upper heat outlet from said heat exchange air flow conduit for discharge of heated air from said heat exchange air flow conduit;

air flow inlet means to said heat exchange air flow conduit for air flow up through said heat exchange air flow conduit and said upper heat outlet;

said air flow control member and said container peripheral wall defining a convection air flow, thermal insulating space therebetween, a top discharge outlet from said space, and bottom air inlet orifices in said container to said space, whereby cooling air can flow by convection through said air flow inlet means, said space and said discharge outlet; and a closure cover and a carrying handle on said closure cover, and thermal insulation between said handle and said closure cover.

13. A portable heater comprising:

a fire chamber vessel having a peripheral wall, a bottom, a depth, a breadth and an open top;

an outer enclosure container around said vessel;

said container having a bottom, a peripheral wall, an open top, and a breadth;

said container bottom being spaced below said vessel bottom;

said container breadth being sufficiently greater than said vessel breadth to cause said container peripheral wall and said vessel peripheral wall to define a circumferential space therebetween;

fastener means between said vessel and said container for retaining said vessel and said container in spaced relationship;

an upright air flow control member in said circumferential space, said control member being spaced from said container peripheral wall to create a thermal insulating space, and spaced from said vessel peripheral wall and oriented to create a heat exchange air flow conduit between said flow control member and said vessel peripheral wall and having an upper heat outlet from said heat exchange air flow conduit for discharge of heated air from said heat exchange air flow conduit;

air flow inlet means to said heat exchange air flow conduit for air flow up through said heat exchange air flow conduit and said upper heat outlet;

said air flow control member and said container peripheral wall defining a convection air flow, thermal insulating space therebetween, a top discharge outlet from said space, and bottom air inlet orifices in said container to said space, whereby cooling air can flow by convection through said air flow inlet means, said space and said discharge outlet; and said outer container bottom has thermal insulation.

14. The portable heater in claim 13 wherein said container bottom has a pair of vertically spaced panels and said thermal insulation comprises an air space between said panels.

15. The portable heater in claim 13 wherein said thermal insulation comprises a solid layer of insulation material.

* * * * *